J. J. LASSEN & V. F. HJORT.
OUTLET OR EXTRACTION PIPE OF FILTERS.
APPLICATION FILED MAR. 12, 1917.

1,266,132.

Patented May 14, 1918.
2 SHEETS—SHEET 1.

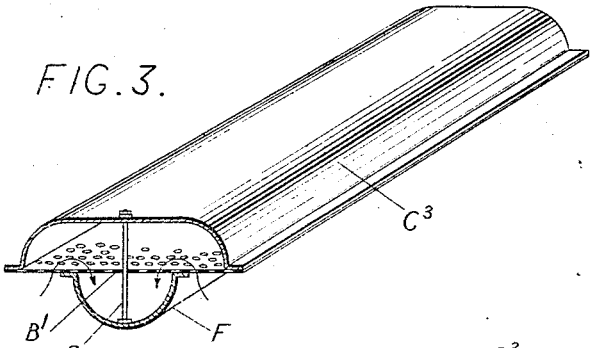
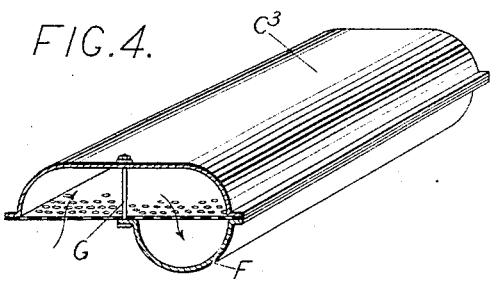
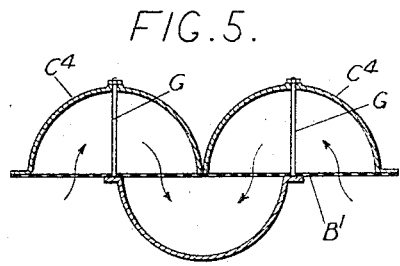
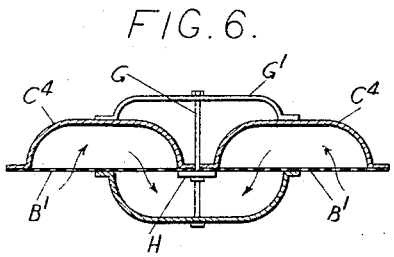
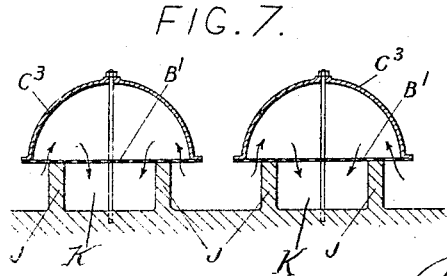

UNITED STATES PATENT OFFICE.

JENS JAKOB LASSEN AND VILHELM FREDERIK HJORT, OF LONDON, ENGLAND.

OUTLET OR EXTRACTION PIPE OF FILTERS.

1,266,132.  Specification of Letters Patent.  Patented May 14, 1918.

Application filed March 12, 1917. Serial No. 154,346.

*To all whom it may concern:*

Be it known that we, JENS JAKOB LASSEN, formerly a subject of the King of Denmark, now a naturalized subject of the King of England, and VILHELM FREDERIK HJORT, a subject of the King of Denmark, both residing at London, in England, have invented certain new and useful Improvements in the Outlet or Extraction Pipes of Filters, of which the following is a specification.

This invention relates to the outlet conduit or extraction pipes of filters its object being the construction of an outlet which will readily allow the passage of the water or other filtered liquid but will tend to keep free from clogging by the sand or other filtering medium. The improved outlet is of the type in which the filtered liquid is caused to change its direction of flow passing for instance up under the edge of a cap or cover and then down through a central pipe. In some outlets of this type a perforated screen is provided through which the liquid passes once.

An outlet according to this invention is so constructed and arranged that the filtered liquid passing through it not only changes its direction of flow but passes more than once through a perforated screen. Preferably the construction is such that the filtered liquid first passes up through one portion of the perforated screen and then passes down through another portion thereof.

The improved outlet comprises a cup or trough, a cap or cover preferably of conical form or domed forming a chamber over the cup or trough and a perforated screen extending over and beyond the edge of the cup or trough to meet the cap.

The outlet may be in the form of a rose or nozzle which can be fitted to the extraction pipe or the screen and cover arranged in the manner described may be fitted to a trough-like member the whole arrangement then forming the outlet or extraction pipe.

In the accompanying drawings.

Figs. 3, 4, 5, 6 and 7 show diagrammatically various other constructions of outlets according to this invention in trough-like form, Figs. 3 and 4 being shown in perspective and Figs. 5, 6 and 7 in cross-section.

Figure 1:
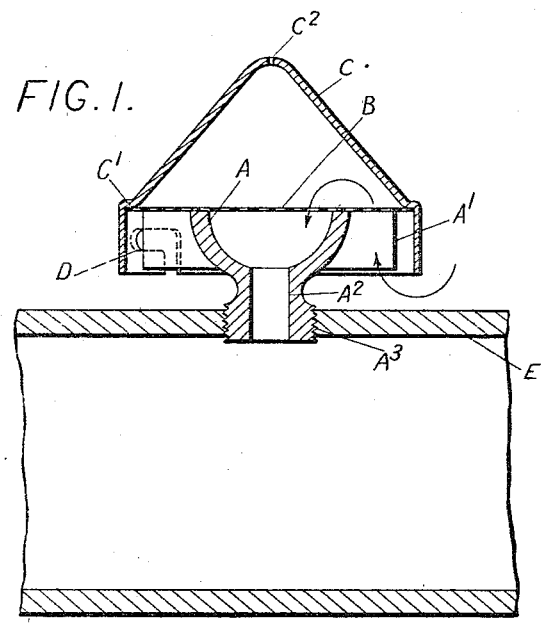
Figure 1 is a central vertical section through one form of outlet according to this invention in the form of a nozzle or rose shown in position in an extraction pipe.
Figure 2:
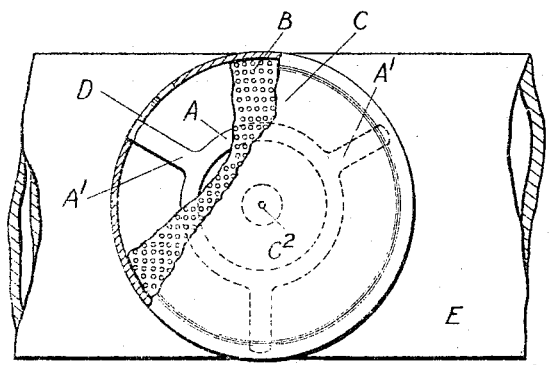
Fig. 2 is a plan of the same, portions being broken away.

With reference first to Figs. 1 and 2 the nozzle illustrated in these figures is made in three portions, a hemispherical cup A with projecting arms A' upon which a perforated screen B is laid extending to the ends of the arms and a conical cover C fitting over the arms and secured to one by a bayonet joint as at D.

The cover is provided with an internal flange C' so that it presses uniformly all around the edge of the perforated screen B and holds it in close contact with the arms A' and the edge of the cup A.

Conveniently the face or edge of the cup A and the upper surfaces of the arms A' are ground flat and the perforated screen B is slightly dished so that the cover, when in position, forces it flat on the arms and on the cup.

The slot forming part of the bayonet joint at D may be slightly inclined so as to force the cover C tightly down as it is turned and if desired some wedge or locking device may be employed to prevent any tendency of the cover to become loosened.

The cup A is provided with a hollow or bored stem $A^2$ having an exterior screw-thread $A^3$ for insertion in a tapped hole in the extraction pipe E and the cover is provided with a small vent or opening $C^2$ to prevent the formation of an air-lock or pocket in the space between the cover and the screen.

In the form illustrated the nozzle is intended to be used in the position shown and the conical cover C then prevents the sand or other filtering medium from pressing upon or choking the perforated screen B. The filtered liquid passing downward through the containing vessel turns upward beneath the edge of the cover C and passes in an upward direction through the annular portion of the screen B between the edge of the cup A and the cover. It thus enters the chamber formed between the screen and the cover C and then passes downward through the central portion of the screen into the cup A and thence into the outlet conduit or extraction pipe E.

The sand or other filtering medium tends to pass over the outside of the cover C in a downward direction and to continue its motion and not to turn upward under the cover with the liquid. Even if a small portion of it is carried upward on to the underside of the annular part of the screen it tends, under the action of gravity, to fall away again and leave the openings in the screen free. The path of motion of the liquid is indicated by the arrows in Fig. 1 it being understood that the flow of liquid takes place all around the inside edge of the cover.

The improved nozzle or rose needs much less cleaning than many other forms of apparatus for the same purpose but when that operation is necessary the usual reversal of flow of the liquid or say, of steam or air through the apparatus will readily free the screen from any of the filtering material or other matter which may have become attached to the underside of the annular portion of the screen. This blowing-through operation is very effective as the liquid, air or the like after passing downward through the annular portion of the screen turns upward all around the edge of the cover in the form of a divergent or spreading jet. Should repair or inspection be necessary the screen can be instantly removed by disengaging the cover at the bayonet joint.

Referring now to Fig. 3 the extraction pipe or conduit takes the form of a half pipe or trough F covered by a perforated screen B' which rests on flanges, on the trough and extends beyond them on each side. Over the screen B' is a cover C³ held tightly down upon the edges of the screen by means of bolts and nuts G.

In Fig. 4 a somewhat similar construction is shown the chief difference being that the cover C³ extends outward beyond the trough F only on one side.

In the form shown in Fig. 5 the cover is made in two parts C⁴ each of a half pipe or similar section. The adjacent edges of these covers C⁴ meet at or over the center of the screen B' while their outer edges meet the corresponding edges of the screen which project beyond each side of the trough.

The construction illustrated in Fig. 6 has both the screen B' and the cover C⁴ made in two portions. The inner adjacent edges of the two parts of the screen are supported by a plate or like member H running longitudinally above the center of the trough and the covers are held in position by bridge pieces or clamps G' and bolts G.

It will be appreciated that the cover and screen may be fastened to or held against the edges of the trough in any convenient way, the examples illustrated being merely diagrammatic and by way of example. In any case the fastening devices are preferably of such a nature that they can readily be undone to allow the screen to be removed.

The conduit or trough need not necessarily be a half pipe though such a construction is convenient in many cases Fig. 7 illustrates a construction in which the trough or conduit K is formed between ridges or walls J built up or formed in the concrete forming the floor or bottom of the filtering chamber. Adjacent pairs of these walls or ridges are covered with perforated screens B' and provided with covers C³, the construction being similar to that illustrated in Fig. 3.

When the outlet is in the form of a nozzle or rose as described with reference to Figs. 1 and 2 it is to be understood that details of construction may be varied without departing from the spirit of this invention, for instance, the attachment of the cup and cover may be by means of a screw-thread. Again, although it is convenient and cheap to form the whole of the perforated screen separate from the cup and from the cover such need not necessarily be the case For instance, the outer part of the screen may be part of the cover in the shape of a perforated internal flange extending over the edge of the cup and gripping the screen thereon. Or, again, the central part of the screen forming the top part of the cup could be attached thereto by a screwed ring or other means independent of the cover.

What we claim as our invention and desire to secure by Letters Patent is:—

1. The combination with an outlet conduit for a filter, of a perforated screen so disposed in relation to the conduit that the filtered liquid is first caused to pass up through a portion of the perforated screen at one side of the conduit and then to pass through another portion thereof into the conduit.

2. The combination with an outlet conduit for a filter, of a cap or cover forming a chamber over the conduit, and a flat perforated screen extending over and beyond the edge of the conduit to meet the cap or cover so that the filtered liquid first passes up through the portion of the screen which extends beyond the edge of the conduit and then passes down through the other portion of the screen which covers the conduit.

3. The combination with an outlet conduit for a filter formed by walls or ridges on the bottom of the filter, of a cap or cover overlapping the conduit, and a flat perforated screen extending over and beyond the edge of the conduit to meet the cap or cover so that the filtered liquid first passes up through the portion of the screen which extends beyond the edge of the conduit and then passes down through the other portion of the screen which covers the conduit.

4. The combination with an outlet conduit for a filter having its side walls provided with flat surfaced edges, of a cap or cover extending over the conduit and beyond the side walls thereof, and having flat surfaces substantially in the plane of the flat surfaces of the edges of the conduit, and a perforated screen extending across the conduit and bearing against the flat surfaces of the conduit and cover, for the purpose described.

5. The combination with an outlet conduit for a filter having its side walls provided with flat surfaced edges, of a flat perforated screen resting on the flat surfaces of and extending beyond the sides of the conduit, and a cover extending over the conduit and beyond the sides thereof into contact with the screen.

In testimony whereof we have signed our names to this specification in the presence of two subscribing witnesses.

JENS JAKOB LASSEN.
VILHELM FREDERIK HJORT.

Witnesses:
 ARCHIBALD JOHN FRENCH,
 ENID PARKER.

Copies of this patent may be obtained for five cents each, by addressing the "Commissioner of Patents, Washington, D. C."